US006688434B2

United States Patent
Johnson et al.

(10) Patent No.: US 6,688,434 B2
(45) Date of Patent: Feb. 10, 2004

(54) CONVEYOR AND LUBRICATING APPARATUS, LUBRICANT DISPENSING DEVICE, AND METHOD FOR APPLYING LUBRICANT TO CONVEYOR

(75) Inventors: David R. Johnson, Woodbury, MN (US); Joseph Dirkson, Shoreview, MN (US); Michael Knox, McDonald, TN (US)

(73) Assignee: Ecolab Inc., St. Paul, MN (US)

( * ) Notice: Subject to any disclaimer, the term of this patent is extended or adjusted under 35 U.S.C. 154(b) by 82 days.

(21) Appl. No.: 10/080,909

(22) Filed: Feb. 22, 2002

(65) Prior Publication Data

US 2003/0159889 A1 Aug. 28, 2003

(51) Int. Cl.⁷ ................................. F16N 13/22
(52) U.S. Cl. ........................................ 184/15.3
(58) Field of Search ................... 184/12, 15.1–15.3, 184/16, 17, 61

(56) References Cited

U.S. PATENT DOCUMENTS

| | | | |
|---|---|---|---|
| 2,098,487 A | 11/1937 | Cooper et al. | |
| 3,148,747 A | 9/1964 | Batchelor | 184/15.1 |
| 3,554,323 A | 1/1971 | Wheelock | 184/15 |
| 3,576,234 A | 4/1971 | Batchelor | 184/15.1 |
| 3,785,456 A | 1/1974 | McIntire et al. | 184/15.1 |

(List continued on next page.)

FOREIGN PATENT DOCUMENTS

| | | |
|---|---|---|
| CA | 2309369 A1 | 11/2000 |
| CN | 1199703 A | 11/1998 |
| DE | 2265037 A | 2/1976 |
| DE | 282965 A | 9/1990 |
| DE | 297222 A5 | 1/1992 |
| DE | 43 32 128 A1 | 3/1995 |
| DE | 198 58 239 A1 | 6/2000 |
| EP | 49598 A | 4/1982 |
| JP | 7198028 A | 8/1995 |
| WO | WO 01/12759 A2 | 2/2001 |

OTHER PUBLICATIONS

Brautigam, D. P., "Automatic lubrication systems in the foundry: a new approach", Trans. Am. Foundrymen's Soc vol. 96, pp. 895–902 (1988) (Abstract Only, 1 Page).
Hitchcox, A., "Oilers add life to chain drives", Power Transmission Design, vol. 25, No. 7, pp. 24–26 (1983) (Abstract Only, 1 Page).

Primary Examiner—Chong H. Kim
(74) Attorney, Agent, or Firm—Merchant & Gould P.C.

(57) ABSTRACT

A conveyor and lubricating apparatus includes a conveyor and a dispensing device. The conveyor includes a conveyor surface and is provided for transporting items on the conveyor surface. Exemplary items that can be transported include plastic bottles, glass bottles, cans, and cartons. The dispensing device provides a spray pattern of a lubricant composition onto the conveyor surface. The dispensing device includes a nozzle that generates the spray pattern, a lubricant dispensing line that supplies the lubricant composition to the nozzle, a nozzle valve that opens and closes in response to the pressure conditions within the lubricant dispensing line to control flow of the lubricant composition to the nozzle, and a spray valve constructed to move between a first position and a second position, wherein the first position causes pressurization of the lubricant dispensing line and the second position provides depressurization of the lubricant dispensing line. A dispensing device is provided and a method for applying a lubricant composition to a conveyor is provided.

33 Claims, 9 Drawing Sheets

U.S. PATENT DOCUMENTS

| | | | |
|---|---|---|---|
| 3,903,994 A | 9/1975 | Hafner | 184/15.1 |
| 3,997,277 A * | 12/1976 | Swisher et al. | 404/84.05 |
| 4,009,764 A | 3/1977 | Hafner | 184/15.1 |
| 4,016,897 A | 4/1977 | Asioli | 137/107 |
| 4,027,744 A | 6/1977 | Kuhnelt et al. | 184/55.1 |
| 4,064,970 A | 12/1977 | Reeves | 184/15.1 |
| 4,085,821 A | 4/1978 | Kast et al. | 184/15.1 |
| 4,196,748 A * | 4/1980 | Gillespie | 137/565.26 |
| 4,212,372 A | 7/1980 | Murphy et al. | 184/15.1 |
| 4,226,325 A | 10/1980 | Vandas | 198/493 |
| 4,271,930 A | 6/1981 | Thomson et al. | 184/15.1 |
| 4,274,509 A | 6/1981 | Thomson et al. | 184/15.1 |
| 4,324,316 A | 4/1982 | Thrasher, Jr. et al. | 184/29 |
| 4,349,085 A | 9/1982 | Roser | 184/6.15 |
| 4,368,803 A | 1/1983 | Dombroski et al. | 184/15.1 |
| 4,506,763 A | 3/1985 | Frost et al. | 184/15.2 |
| 4,537,285 A | 8/1985 | Brown et al. | 184/15.2 |
| 4,648,486 A | 3/1987 | Kayser et al. | 184/15.1 |
| 4,844,203 A | 7/1989 | Brown et al. | 184/15.3 |
| 4,893,697 A | 1/1990 | Tosi | 184/7.4 |
| 5,129,480 A | 7/1992 | Garrett et al. | 182/63 |
| 5,289,899 A | 3/1994 | King | 184/12 |
| 5,337,884 A | 8/1994 | Hoffman et al. | 198/500 |
| 5,624,690 A | 4/1997 | Boldis et al. | 425/100 |
| 5,758,761 A | 6/1998 | Selbertinger et al. | 198/495 |
| 5,772,003 A | 6/1998 | Hunt | 198/495 |
| 5,806,630 A | 9/1998 | Bernal | 184/6.26 |
| 6,207,622 B1 | 3/2001 | Li et al. | 508/208 |
| 6,288,012 B1 | 9/2001 | Li et al. | 508/113 |
| 6,302,263 B1 | 10/2001 | Bennett et al. | 198/495 |

* cited by examiner

CONVEYOR AND LUBRICATING APPARATUS, LUBRICANT DISPENSING DEVICE, AND METHOD FOR APPLYING LUBRICANT TO CONVEYOR

FIELD OF THE INVENTION

The invention relates to a conveyor and lubricating apparatus, a lubricant dispensing device, and a method for applying lubricant composition to a conveyor. In particular, the lubricant composition is sprayed onto the conveyor in discrete pulses to provide a desired level of lubricity between the conveyor and items being conveyed on the conveyor.

BACKGROUND OF THE INVENTION

Lubricants are conventionally applied to conveyors in bottle processing plants to reduce friction between the conveyors and the bottles being conveyed on the conveyors to reduce incidents of bottles tipping over. The tipping over of bottles at a bottling plant requires manual intervention by an operator resulting in loss of productivity. In addition, fluid from bottles may cause the conveyers to become sticky and result in additional tip over of bottles. Bottles that are conventionally processed on conveyors in bottling plants include cans, glass containers, and plastic bottles. A common type of plastic material used to form plastic bottles includes polyethylene terephthalate (PET). Bottles that are commonly processed on conveyors include 20 ounce, 24 ounce, half liter, 1 liter, and 2 liter bottles.

A type of lubricant composition that is commonly applied to conveyors in bottling plants is a fairly dilute aqueous system that is continuously sprayed onto the conveyor. Certain lubricant compositions have a tendency to look messy because they are foaming on a conveyor or drip from a conveyor.

SUMMARY OF THE INVENTION

A conveyor and lubricating apparatus is provided according to the invention. The conveyor and lubrications apparatus includes a conveyor and a dispensing device. The conveyor includes a conveyor surface and is provided for transporting items on the conveyor surface. The dispensing device provides a spray pattern of a lubricant composition onto the conveyor surface. The dispensing device includes a nozzle that generates the spray pattern, a lubricant dispensing line that supplies the lubricant composition to the nozzle, a nozzle valve that opens and closes in response to the pressure conditions within the lubricant dispensing line to control flow of the lubricant composition to the nozzle, and a spray valve constructed to move between a first position and a second position, wherein the first position causes pressurization of the lubricant dispensing line and the second position provides depressurization of the lubricant dispensing line. The dispensing device can include two or more nozzles and nozzle valves constructed to operate in response to a single spray valve. In addition, the dispensing device can include two or more spray valves that separately control dispensing of the lubricant composition through separate nozzles and nozzle valves.

A dispensing device is provided according to the invention. The dispensing device provides a spray pattern of a lubricant composition and includes a nozzle, a lubricant dispensing line, a nozzle valve, and a spray valve.

A method for applying a lubricant composition to a conveyor surface is provided according to the invention. The method includes a step of periodically spraying a lubricant composition onto the conveyor surface to reduce the coefficient of friction between the conveyor surface and items conveyed on the conveyor surface by applying the lubricant composition through the dispensing device. The step of periodically spraying can include spraying the lubricant composition through a nozzle at a pressure of at least about 20 psig for between about 1 second and about 20 seconds at a frequency of between about 1 minutes and about 10 minutes.

DETAILED DESCRIPTION OF THE PREFERRED EMBODIMENT

A conveyor and lubricating apparatus according to the invention provides a periodic, discrete pulse or spray of a lubricant composition to the surface of a conveyor. By controlling the spray pattern through a nozzle and the placement of spray nozzles relative to the conveyor surface, it is believed that sufficient coverage of the lubricant composition on the conveyor surface can be achieved by periodic application of the lubricant composition. It should be understood that the phrase "periodic application of the lubricant composition" refers to the application of the lubricant composition in discrete pulses. The application of the lubricant composition will include alternating periods of applying the lubricant composition and periods of not applying the lubricant composition.

The lubricant composition can be referred to more simply as the "lubricant" and can be provided as a concentrate or as a dilute solution. The lubricant composition can be referred to as a concentrate when it is more concentrated than many commercially available lubricant compositions applied to a conveyor surface. Lubricant compositions that are commonly applied to conveyors often have a water concentration in the range of about 98.5 wt. % to about 99.75 wt. %. The lubricant composition that can be applied to a conveyor surface according to the invention can have a water concentration, if water is present at all, at between about 0.1 wt. % and about 99.9 wt. %. In addition, the term "concentrate" can refer to a lubricant composition that has been diluted from a more concentrated composition. It is expected that the lubricant composition may be diluted on line. That is, a fairly concentrated lubricant composition will be supplied and then diluted at some point in the dispensing device.

When the lubricant applied to the conveyor surface is in the form of a "concentrate" it can have a water concentration that is less than about 85 wt. %, that is less than 60 wt. %, that is less than 50 wt. %, and that is less than 1 wt. %.

The items or articles conveyed on the conveyor can be any type of item or article that is suitable to be conveyed on a conveyor. The conveyor and lubrication apparatus according to the invention can be used in bottling or packaging facilities where the items or articles conveyed include cans, glass containers, plastic bottles, and cartons. A type of can that is commonly conveyed is an aluminum can. A type of plastic bottle that is commonly conveyed on conveyors includes polyethylene terephthalate (PET) bottles.

Figure 1:
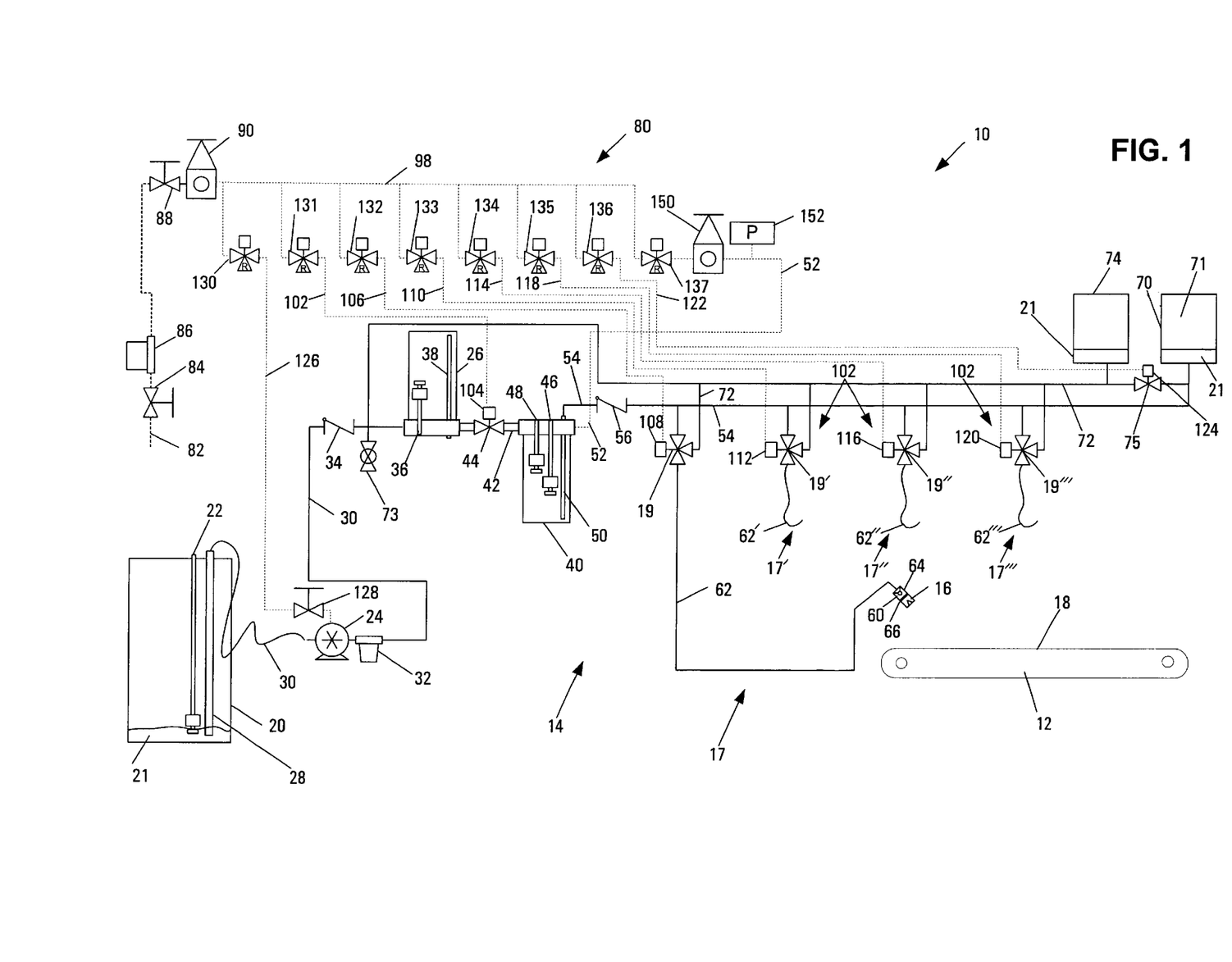
FIG. 1 is a schematic diagram of a conveyor and lubricating apparatus according to the principles of the present invention.

Referring to FIG. 1, a conveyor and lubricating apparatus is shown at reference numeral 10. The conveyor and lubricating apparatus includes a conveyor 12 and a dispensing device 14. The conveyor can be a transport conveyor, a deceleration conveyor, an acceleration conveyor, or combination thereof. In general, it is expected that the dispensing device 14 can be used within a facility that may include one or more conveyors and/or one or more locations along each conveyor at which discrete pulses or sprays of lubricant can be provided. The schematic diagram of FIG. 1 shows a spray nozzle 16 that dispenses a lubricant composition having a desired spray pattern onto the conveyor surface 18 of the conveyor 12. It should be understood that in order to provide coverage across the width of the conveyor, it may be desirable to provide multiple spray nozzles where each spray nozzle provides a certain width of spray. By arranging multiple spray nozzles at intervals across the conveyor surface 18 equal to about the width of spray, it is possible to provide a desired level of coverage across the width of the conveyor surface 18. Although the conveyor and lubricating apparatus 10 is described with reference to FIG. 1 showing a single spray nozzle 16, it should be understood that additional spray nozzles can be provided in series with the spray nozzle 16 as part of the spray zone 17. The phrase "spray zone" refers to one or more spray nozzles controlled by a single spray valve 19. As shown in FIG. 1, the dispensing apparatus 14 can include a plurality of spray zones 17, 17', 17", and 17'" controlled by spray valves 19, 19', 19", and 19'", respectively. If desired, additional spray zones can be provided, and each spray zone can include one or more spray nozzles. In addition, the additional spray zones can be used for application of lubricant composition to the same or different conveyors within a facility.

The dispensing device 14 is provided for generating a discrete pulse or spray of lubricant having a desired spray pattern while providing a relatively consistent application of lubricant over the area of spray. The dispensing device 14 can provide a relatively even distribution of lubricant across the spray area while avoiding high concentrations of lubricant in particular areas as a result of dripping of lubricant or a pulse of lubricant having insufficient pressure to generate the desired spray pattern. A problem with a high concentration of lubricant in a particular area is that it reflects a level of waste of lubricant. It is believed that the most efficient distribution of lubricant occurs when the desired spray pattern is achieved to provide a sufficient level of lubricity between the conveyor surface and the items being conveyed. While it may not be possible to provide a perfectly even distribution of lubricant across a conveyor surface, it is advantageous to reduce incidence of high concentration of lubricant in specific areas.

The spray nozzle 16 is selected to provide a desired spray pattern. Numerous spray nozzles are commercially available having different spray patterns. These spray nozzles are generally identified as exhibiting a certain configuration of spray pattern when the fluid passing through the nozzle is provided within a certain pressure range. For a selected spray nozzle, the operating parameters of the dispensing device 14 can be selected to provide the desired spray pattern for the spray nozzle. That is, the dispensing device operating parameters can be selected to provide the lubricant composition to the nozzle at the desired pressure for that nozzle to generate the desired spray pattern. In addition, the dispensing device 14 can be constructed and arranged to achieve the desired pressure at the spray nozzle to allow the spray nozzle to generate the desired spray pattern. The difficulty in achieving a discrete spray of lubricant relates to the distance between the spray nozzle and the source of pressurized lubricant. As the distance increases, it is difficult to provide the desired pressure spikes that reflect a rapid increase in pressure that triggers the spray pattern and a rapid decrease in pressure that shuts off flow of lubricant through the spray nozzle.

The dispensing device 14 can be described in terms of how it operates. A lubricant composition 21 can be provided in the lubricant product tank 20 and serves as the source of the lubricant composition. The lubricant product tank 20 includes a low level sensor 22 that detects a low level condition of lubricant within the lubricant product tank 20. When low level conditions are detected, a signal is generated indicating that additional lubricant composition 21 can be provided to the lubricant product tank 20.

A lubricant conveyor pump 24 is provided for conveying the lubricant 21 from the lubricant product tank 20 to the recycle tank 26. The lubricant 21 is removed from the lubricant product tank 20 via the lubricant draw line 28 and the lubricant line 30. A filter 32 is provided for filtering the lubricant to remove particulates. Exemplary filtering media that can be used in the filter 32 include commercially available cartridge type filtering media. A check valve 34 is provided to create one-way flow of lubricant out of the lubricant product tank 20 and into the recycle tank 26 and prevent back flow of lubricant into the lubricant product tank 20.

The recycle tank 26 includes a high level sensor 36 that detects a high level of lubricant condition within the recycle tank 26. When high level condition is achieved, the recycle tank 26 is sufficiently full of lubricant and a signal is generated to reduce or stop flow of lubricant from the lubricant conveyor pump 24. The recycle tank 26 additionally includes a vent 38 to allow for venting of the recycle tank 26. The recycle tank 26 can be vented to a relatively low pressure environment such as atmospheric pressure. If desired, the recycle tank can be placed under a vacuum.

Lubricant in the recycle tank 26 is conveyed to the delivery tank 40 via the conduit 42. A recycle valve 44 is provided for controlling the flow of lubricant from the recycle tank 26 to the delivery tank 40. When the recycle valve 44 is open, lubricant flows from the recycle tank 26 into the delivery tank 40. The relative placement of the recycle tank 26 and the delivery tank 40 can allow for the lubricant to flow from the recycle tank 26 into the delivery tank 40 under the force of gravity.

The delivery tank 40 includes a low level sensor 46 and a high level sensor 48. The low level sensor 46 provides a signal when the level within the delivery tank 40 decreases below a predetermined minimum amount. The high level sensor 48 provides a signal when the amount of lubricant in the delivery tank 40 exceeds a predetermined high amount. The signal generated by the low level sensor 46 causes the recycle valve 44 to open allowing lubricant to flow from the recycle tank 26 into the delivery tank 40. The signal generated by the high level sensor 48 causes the recycle valve 44 to close.

Lubricant flows out of the delivery tank 40 under pressure via the lubricant dispensing line 50. The delivery tank 40 is pressurized by the gaseous pressure line 52. Lubricant flows through the lubricant dispensing line 50 and into the high pressure lubricant line 54. A check valve 56 provides one-way flow of lubricant through the high pressure lubricant line 54 so that lubricant does not flow backwards into the delivery tank 40.

Lubricant under pressure is provided to the lubricant spray or dispensing valve 19. As shown in FIG. 1, several lubricant spray valves can be provided along the high pressure lubricant line 54 and are referred to as lubricant spray valves 19', 19", and 19'". It should be understood that additional lubricant spray valves can be provided if it is desired to provide additional zones for the delivery of lubricant. The operation of the dispensing device 14 is described in the context of the operation of the lubricant spray valve 19 to provide a spray zone 17. It should be understood that additional lubricant spray valves, if provided, can be operated in the same or similar manner as the lubricant spray valve 19. In addition, each of the spray zones can include one or more spray nozzle.

The lubricant spray valve 19 controls flow by moving between a first position and a second position. When the lubricant spray valve 19 is in the first position, the lubricant spray valve 19 can be considered open and the lubricant flows under pressure into the lubricant dispensing line 62 and through the nozzle 16. When the lubricant spray valve 19 is in the second position, the lubricant spray valve 19 can be considered closed because lubricant flow from the high pressure lubricant line 54 to the lubricant dispensing line 62 is restricted or stopped. When the lubricant spray valve 19 is in the second position, the lubricant dispensing line 62 can be open to the lubricant venting line 72 to decrease pressure in the lubricant dispensing line 62. Lubricant can be allowed to flow from the lubricant dispensing line 62 into the lubricant venting line 72.

A lubricant nozzle valve 60 can be provided to control flow of lubricant through the nozzle 16 based upon the pressure conditions within the lubricant dispensing line 62. The nozzle valve 60 can be a back pressure check valve 64 that provides one-way flow of lubricant through the nozzle 16 when a threshold pressure is achieved and stops the flow of lubricant when the pressure decreases below the threshold pressure. The back pressure check valve 64 can be selected so that when it opens, it provides lubricant at a pressure that is sufficient to generate the desired spray pattern from the nozzle 16, and when the pressure of the lubricant decreases to below the threshold pressure, the flow of lubricant is shut off to reduce dripping of lubricant through the nozzle 16. The threshold pressure can be any pressure or range of pressure above which the back pressure check valve 64 is open and below which the back pressure check valve 64 is closed. Accordingly, the design of the dispensing apparatus 14 can be constructed to provide pressure conditions within the lubricant dispensing line 62 that allows the back pressure check valve 64 to open and close under appropriate pressure conditions so that the nozzle 16 can provide a desired spray pattern when lubricant is flowing through the nozzle. If the threshold pressure is too low, it is expected that the pressure conditions in the lubricant dispensing line may not get low enough sufficiently quickly to close flow to the nozzle 16. As a result, there may be some level of dripping of lubricant through the nozzle 16. In addition, if the threshold pressure is too high, it is expected that the pressure conditions within the lubricant dispensing line 62 may not achieve a rapid opening of the back pressure check valve 64 to generate the desired spray pattern from the nozzle 16. An exemplary operating threshold pressure is believed to be a pressure between about 5 psig and about 10 psig. A filter 66 can be provided to protect the spray nozzle 16. The filter 66 can be any filter that allows flow of the lubricant therethrough while restricting the flow of materials that may harm the spray nozzle 16. An exemplary filter is a 200 mesh screen.

A difficulty in achieving high pressure conditions within the lubricant dispensing line 62 relates to the distance between the back pressure check valve 64 and the delivery tank 40. It is expected that a pressure drop will occur along the length of the high pressure lubricant line 54 and along the length of the lubricant dispensing line 62. In order to reduce the effect of the pressure drop along the high pressure lubricant line 54, a pressure chamber 70 can be provided to help create high pressure conditions along the entire length of the high pressure lubricant line 54. It is believed that the pressure chamber 70 acts as a pressure storage tank to help more evenly distribute pressure throughout the high pressure lubricant line 54. The pressure chamber 70 includes lubricant 21 and compressed air 71. It is believed that it is the compressed air 71 that helps evenly distribute pressure throughout the high pressure line 54. In addition, it is expected that air bubbles that may exist within the high pressure lubricant line 54 will float upward and eventually end up in the pressure chamber 70. It is generally not desirable for air bubbles to be present within the lubricant because it is believe that air bubbles cause a pressure drop or a dampening of pressure response.

When the lubricant spray valve 19 is closed, the pressure within the lubricant dispensing line 62 is quickly reduced because the lubricant dispensing line 62 is open to the lubricant venting line 72. The lubricant venting line 72 is in communication with the pressure relief chamber 74 and the recycle tank 26. As discussed previously, the recycle tank 26 can be vented to atmospheric pressure. As the lubricant spray valve 19 closes, the pressure conditions within the lubricant dispensing line 62 equilibrate with the pressure conditions within the lubricant venting line 72. It is believed that the pressure within the lubricant dispensing line 62 quickly drops to below the threshold pressure causing the back pressure check valve 64 to close. In addition, while the lubricant dispensing line 62 and the lubricant venting line 72 are open to each other, it is believed that air bubbles that may be present within the lubricant dispensing line 62 can flow into the lubricant venting line 72, and then flow into the pressure relief chamber 74. It is expected that the pressure relief chamber 74 functions to aid in reducing the pressure throughout the length of the lubricant venting line 72 and the lubricant dispensing lines 62, 62', 62", and 62'". One concern is that the length of the lubricant venting line 72 may cause a slower decrease in pressure at locations farther from the recycle tank 26. The pressure relief chamber 74 is provided to help more quickly reduce pressure at locations farther from the recycle tank 26.

The lubricant spray valve 19 can be configured so that the lubricant dispensing line 62 is provided below the lubricant venting line 72 and/or the high pressure lubricant line 54. That is, the lubricant spray nozzle 19 can be configured so that air bubbles within the lubricant dispensing line 62 may rise and pass through the lubricant spray valve 19 and into the lubricant venting line 72 and/or the high pressure lubricant line 54. It is expected that in most situations, the lubricant dispensing line 62 will be vented to the lubricant venting line 72 for a longer period of time than it is provided under pressure to the high pressure lubricant line 54. In addition, lubricant will be flowing from the high pressure lubricant line 54 into the lubricant dispensing line 62, and it is expected that an amount of lubricant will flow from the lubricant dispensing line 62 into the lubricant venting line 72. This means that the greater opportunity for air bubbles to leave the lubricant dispensing line 62, if the air bubbles are present at all, is by flowing into the lubricant venting line 72. Air bubbles are not desired in the lubricant dispensing line 62 because the air bubbles have a tendency to dampen the pressure spikes at the nozzle valve 60 and spray nozzle 16.

It is expected that a small amount of lubricant may actually flow from the lubricant dispensing line 62 into the lubricant venting line 72 and eventually into the recycle tank 26. One reason for this is the expansion and contraction of the lubricant dispensing line 62 as the pressure conditions within the lubricant dispensing line 62 change. When the lubricant dispensing line 62 is under pressure, it is believed that the lubricant dispensing line may expand radially allowing more lubricant into the line. When the pressure is reduced, it is believed that the lubricant dispensing line 62 may contract thereby forcing an amount of the lubricant out of the lubricant dispensing line 62 and into the lubricant venting line 72 and, eventually, into the recycle tank 26.

On occasion, the lubricant 21 provided in the pressure chamber 70 and the pressure relief chamber 74 can be drained to the recycle tank 26 or out of the dispensing device 14 via the drain 73. The relief valve 75 can be opened allowing the pressure conditions within the pressure chamber 70 and the pressure relief chamber 74 to equilibrate. It is expected that the pressure within the high pressure line 54 and the pressure chamber 70 will cause the lubricant to flow into the recycle chamber 26 or through the drain 73. The relief valve 75 can then be closed and the dispensing device 14 can be repressurized.

The dispensing device 14 includes an operating system 80 for controlling the operation of the components of the device. The operating system 80 can be provided as an electrical system that controls the opening and closing of valves and the powering of pumps, or it can be provided as a pneumatic system. It is expected that a pneumatic system is advantageous because air pressure can be more convenient and less expensive to work with compared with electrical systems. One problem with an electrical system is that electrical wires may need to be placed within a conduit in a bottling facility and that may require an additional expense.

Referring to FIG. 1, an air supply 82 is provided for powering the operating system 80. The broken lines in FIG. 1 represent air pressure lines. An air supply valve 84 is provided for controlling the flow of pressured air from the air supply 82. In general, the air supply 82 can be a conventional plant air supply source and can be provided at a pressure of at least about 70 psig. Conventional plant air supply sources provide air at a pressure of between about 70 psig and about 100 psig. An air filter 86 can be used to remove particulates from the air. A secondary air supply valve 88 can be provided for further controlling air flow. A pressure regulator 90 can be provided for controlling the air pressure in the operating system pressure line 98. The operating system pressure line 98 can be provided at a pressure sufficient to operate the pneumatic actuated valves that are represented in FIG. 1 by reference numerals 104, 108, 112, 116, 120, and 124. For example, pressure line 102 operates the pneumatic actuated valve 104, the pressure line 106 operates the pneumatic actuated valve 108, the pressure line 110 operates the pneumatic actuated valve 112, the pressure line 114 operates the pneumatic actuated valve 116, the pressure line 118 operates the pneumatic actuated valve 120, and the pressure line 122 operates the pneumatic actuated valve 124. In addition, the pressure line 126 operates the lubricant refill pump 24. A valve 128 can be provided for controlling flow of air to the lubricant refill pump 24. In addition, valves 130–137 can be provided for controlling flow of air from the operating system pressure line 98. Each of the valves 130–137 can be operated electronically. In addition, each of the valves can be provided with a relief line R. A pressure regulator 150 can be provided for controlling pressure in the gaseous pressure line 52. A pressure gauge 152 can be provided for measuring the pressure in the gaseous pressure line 52.

It should be understood that the air pressure in the various lines are selected to provide proper operation of the dispensing apparatus 14. For example, the pressure within the operating pressure line 98 can be selected to properly operate the lubricant recycle pump 24 and the pneumatic actuated valves. The pump and the valves can be commercially available and one skilled in the art would understand the pressure requirements to operate the pump and/or the valves. In general, it is expected that enough pressure to open the valves may be at least about 20 psig. If there is a long distance to certain valves, it may be desirable to provide a pressure of at least about 40 psig. In addition, one skilled in the art would understand that higher pressures allow the valves to open and close more quickly. Accordingly, it may be advantageous to provide a pressure within the operating system pressure line 98 of between about 60 psig and about 80 psig. The air pressure within the gaseous pressure line 52 is sufficient to operate the nozzle valve 60 and provide the spray nozzle 16 with the desired spray pattern. An exemplary air pressure in the gaseous pressure line 52 is between about 40 psig and about 60 psig.

Figure 2:
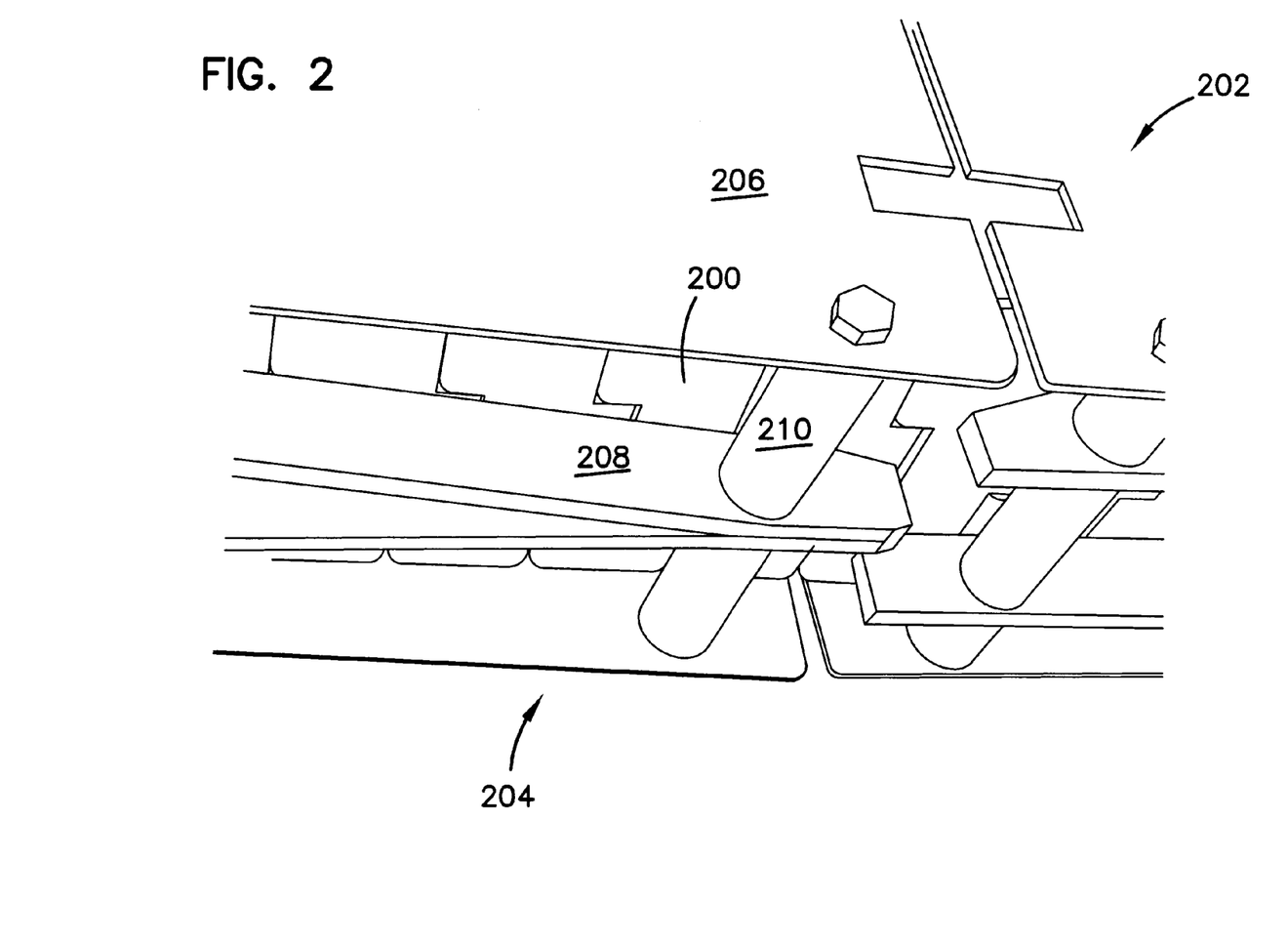
FIG. 2 is a perspective view of a support structure for a conveyor.
Figure 3:
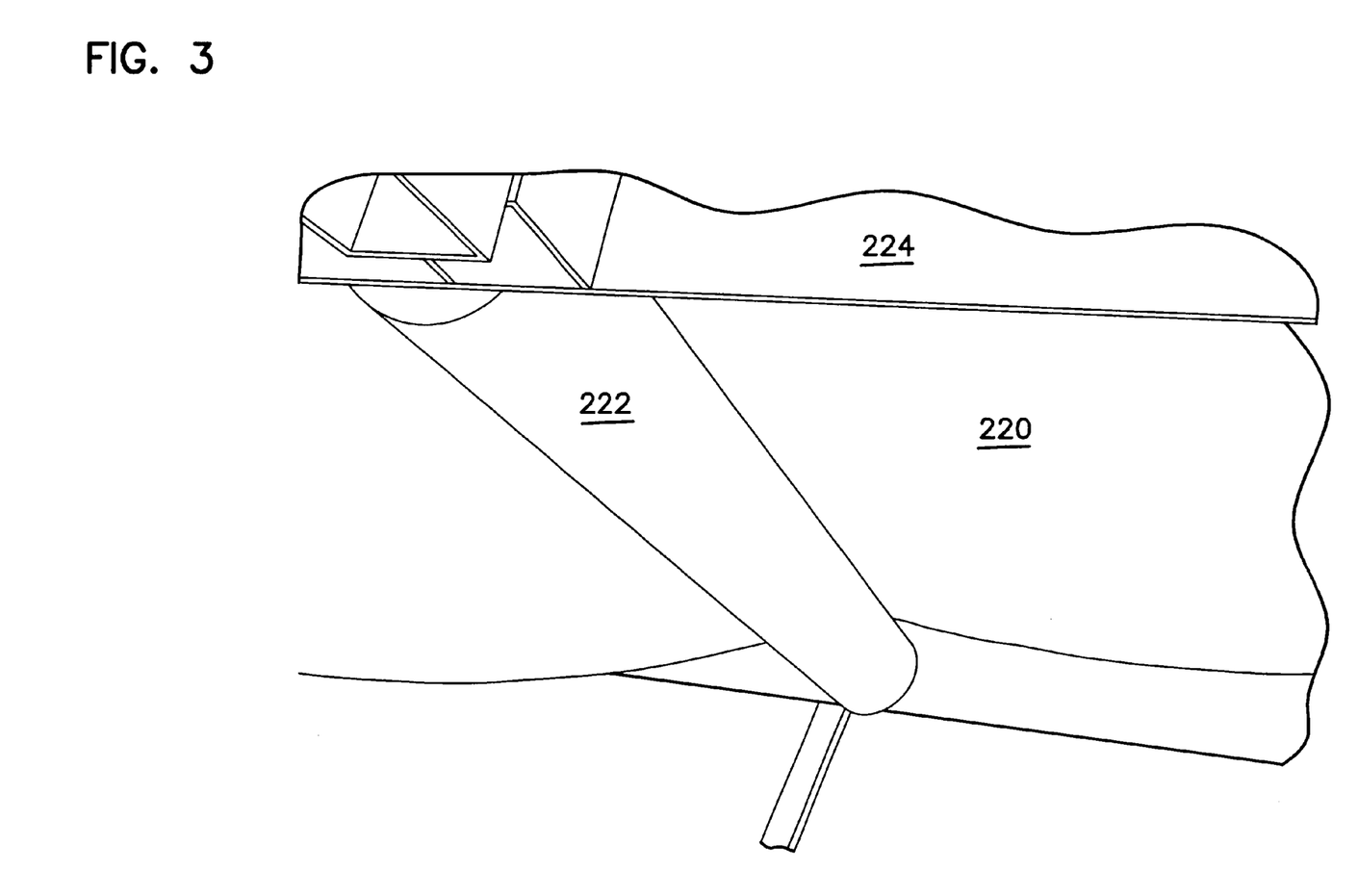
FIG. 3 is a perspective view of a support structure for a conveyor.
Figure 4:
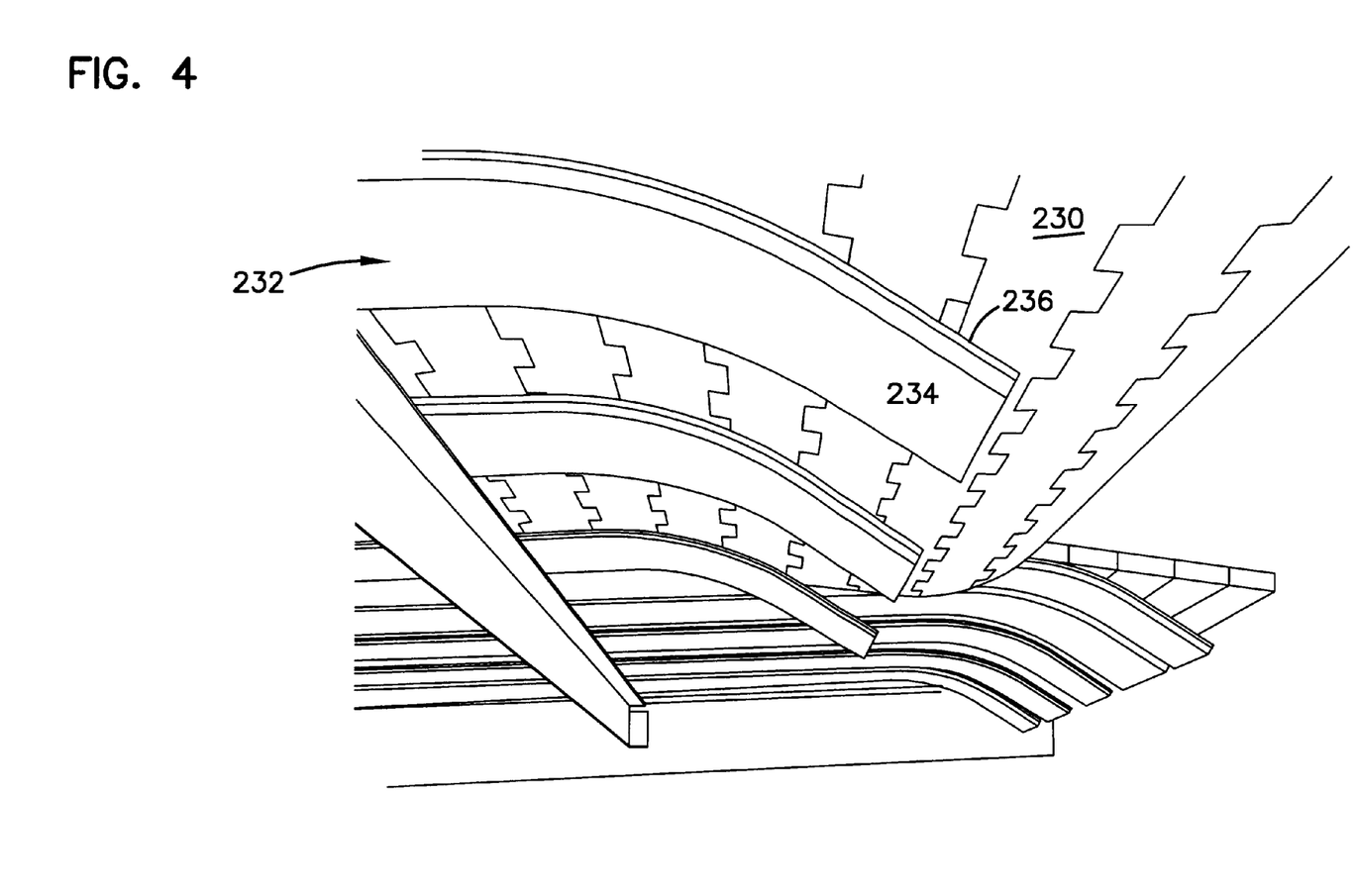
FIG. 4 is a perspective view of a support structure for a conveyor.

Now referring to FIGS. 2–4, exemplary conveyor structures are shown that can be used to distribute the lubricant on the conveyor surface. Because the lubricant is periodically sprayed onto the conveyor surface, it is desirable to spread the lubricant onto the portions of the conveyor surface that do not receive lubricant as a result of a direct spray thereon. In general, it is expected that the spray pattern or a series of spray patterns will result in application of the lubricant composition across the width of the conveyor. It is recognized that a spray application may not perfectly distribute lubricant across the width of the conveyor. Accordingly, there may be gaps in the application of the lubricant composition across the width of the conveyor. In addition, because of the periodic spraying of the lubricant composition onto the conveyor surface, it is expected that there will be gaps of lubricant composition along the length of the conveyor surface. Accordingly, it is desirable to spread the lubricant composition across both the width and length of a conveyor surface to provide a desired level of lubricity between the conveyor surface and items conveyed on the conveyor. It is expected that the items conveyed on the conveyor will provide a certain level of distribution of the lubricant across both the width and the length of the conveyor. In addition, it is believed that the support structure that supports the conveyor will help distribute the lubricant.

Now referring to FIG. 2, the conveyor surface 200 of a conveyor 202 is shown supported by a support structure 204. The view of FIG. 2 is a bottom perspective view of a conveyor 202. The supporting conveyor wall 206 has a conveyor return support 208 attached to it by a support rod 210. The conveyor return support 208 helps spread lubricant composition across both the width and the length of the conveyor surface 200.

Now referring to FIG. 3, a conveyor surface 220 is shown supported by a roller 222. The roller 222 is attached to the conveyor wall 224. As the conveyor surface 220 moves over the roller 222, it is expected that the lubricant composition will spread across the length of the conveyor surface 220.

FIG. 4 shows a conveyor surface 230 that is supported by a conveyor support structure 232. The conveyor support structure 232 includes a steel support member 234 and a plastic wear plate 236. As the conveyor surface 230 moves across the conveyor support structure 232, it is expected that the lubricant composition will distribute across the length of the conveyor surface 230.

The lubricant composition that can be used according to the invention can be any lubricant composition that can be sprayed through a nozzle to provide a desired spray pattern under desired operating pressures. Various lubricant compositions that can be used according to the invention are disclosed in U.S. Pat. Nos. 6,207,622, 6,288,012, International Publication No. WO 01/12759, U.S. Pat. Nos. 5,559,087, 5,062,979, 6,214,777, U.S. application Ser. No. 09/745,296, and U.S. application Ser. No. 09/596,599. The disclosures of these documents are incorporated herein by reference in their entirety. Exemplary lubricant compositions that can be used according to the invention can be characterized as fatty acid based lubricant compositions, fatty amine based lubricant compositions, and synthetic surfactant based lubricant compositions. Components that can be incorporated into the lubricant composition that can be used according to the invention include lubricants (such as fatty acids, fatty amines, and synthetic lubricants), surfactants (such as ionic surfactants, cationic surfactants, nonionic surfactants, and amphoteric surfactants), neutralizing agents, anti-wear agents, anti-microbial agents, foam modifiers, viscosity modifiers, chelating agents, detergents, dispensing agents, and carriers.

The dispensing device according to the invention can be operated at a steady state condition that is sufficient to provide the conveyor surface with the desired level of lubricity. The frequency of spray through the nozzle can be provided at a higher rate when starting up the dispensing apparatus compared with steady state operations. After start up, it is expected that if the frequency of spray is too long, there may be insufficient lubricity between the conveyor surface and items being conveyed on the conveyor. In addition, if the frequency is too short, it is expected that there may be a level of waste and increased costs. It should be understood that the spray frequency will depend upon the particular lubricant composition that is being applied and the amount of lubricant composition applied by each spray. For most lubricant compositions, it is expected that a spray frequency of between about 1 minute and about 10 minutes is sufficient to provide desired lubricity at steady state conditions. In addition, the amount of lubricant composition dispensed through the nozzle with each spray depends upon the nozzle design, the pressure behind the nozzle, the lubricant composition, and the desired level of lubricity between the conveyor surface and the items being transported on the conveyor. If too little lubricant composition is sprayed, it is expected that there will be insufficient lubricity between the conveyor and the items being transported on the conveyor. If too much of the lubricant composition is sprayed, it is expected that there will be some waste and increased cost. Accordingly, in many applications it is expected that the spray or pulse will last between about 1 second and about 20 seconds, and can last between about 1 second and about 10 seconds, and can last between about 1 second and about 5 seconds. The amount of lubricant composition dispensed per spray depends on the pressure to the nozzle and the length of the pulse or spray and the capacity of the nozzle. If too little amount is dispensed, it is expected that the desired level of lubricity between the conveyor surface and the items being conveyed will not be achieved, and if too much of the lubricant composition is dispersed, it is believed that there will be increased cost. In many applications, it is expected that each pulse or spray from the nozzle will dispense between about 0.5 grams and about 10 grams of lubricant composition, and can dispense between about 1 gram and about 5 grams of lubricant composition. If the lubricant composition is relatively dilute, and the length of the spray or pulse is relatively high, it is expected that there may be up to 20 grams of lubricant composition dispensed through each nozzle.

Because the lubricating device according to the invention utilizes discrete pulses, it is believed that a generally wider spray pattern can be achieved, if desired, compared with prior art continuous spray systems. This mean that the dispensing device according to the invention can utilize fewer nozzles to cover the width of a conveyor compared with certain prior art continuous systems. It is expected that certain prior art continuous spray systems achieve a spray pattern having a width of up to about 9 inches. The spray pattern that can be achieved by the dispensing device according to the invention can have a width that is greater than 9 or greater than 10 inches. The width of the spray pattern can be less than 9 or 10 inches. One reason to have a relatively small spray pattern width may be because the conveyor surface has a relatively small width. It is expected that a fairly common spray pattern width that can be achieved according to the invention is between about 4 inches and about 30 inches, and can be between about 18 inches and about 30 inches. Furthermore, it is expected that these widths will be achieved with a pressure of at least about 20 psig or at least about 25 psig.

The dispensing device according to the invention helps maintain a pressure spike at the spray nozzle even when the spray nozzle is located at a considerable distance away from the product tank. For example, the desired pressure spike can be achieved to provide the desired spray pattern when the spray nozzle is located at least 10 feet away from the product tank, or at least 50 feet away from the product tank. It is expected that the desired spray pattern can be achieved when the spray nozzle is located 400 feet away from the product tank. It should be understood that the distances are calculated based upon the linear feet of line through which the lubricant flows.

The following examples are presented to demonstrate the principles of the invention. They should not be relied upon to narrow the scope of the invention.

EXAMPLE 1

Friction Relief on Stationary Bottles

Figure 5:
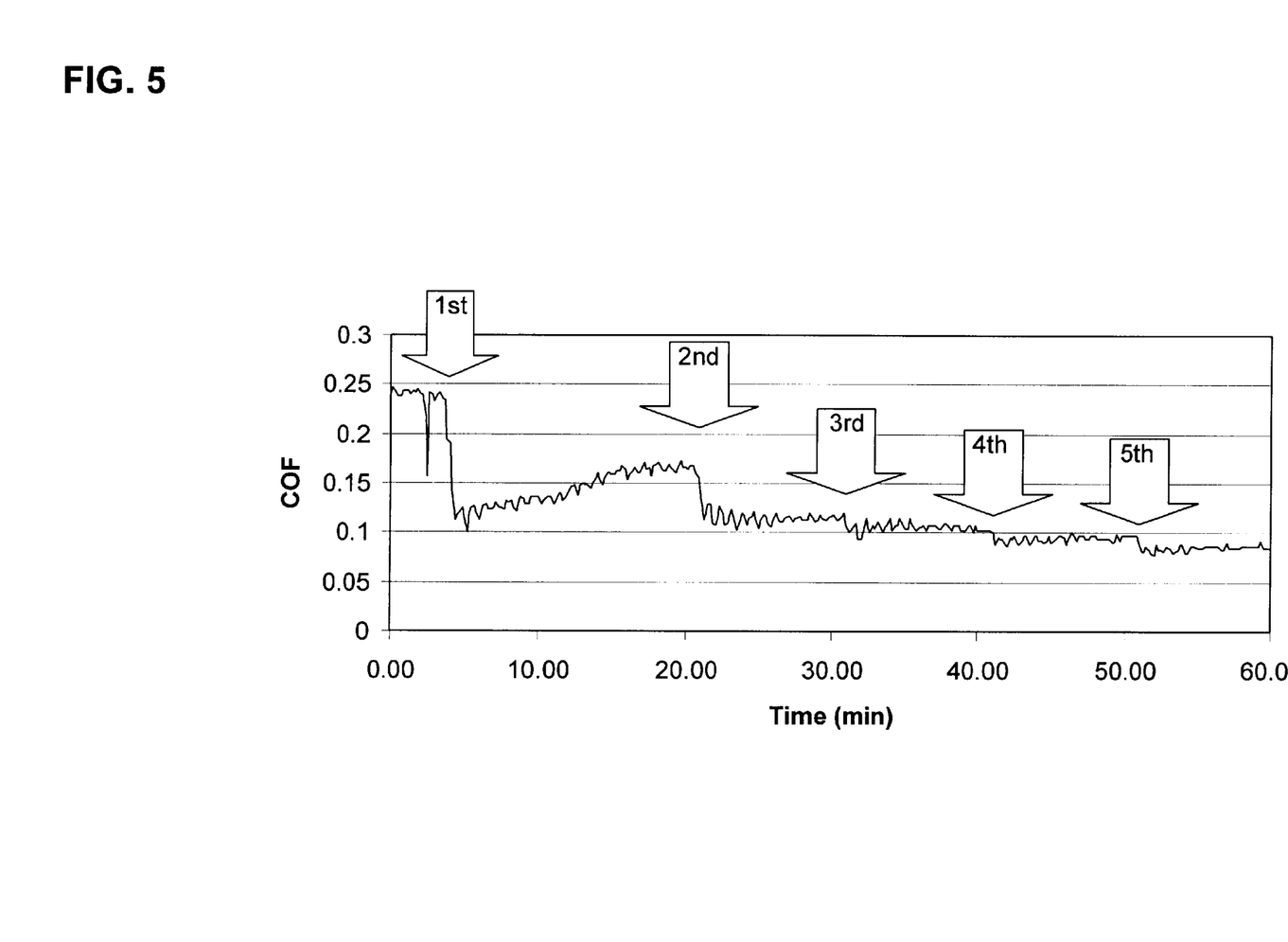
FIG. 5 is a graphical representation of coefficient of friction as a function of time for the results of Example 1.

Six 2 liter PET bottle are held stationary over a plastic conveyor moving at 100 feet per minute. The coefficient of friction (COF) is measured with time as lubricant is pulsed on the conveyor every 10 minutes. In this example, 0.97 grams of lubricant are applied onto the conveyor with each pulse. The example was run for 300 minutes. The coefficient of friction for the initial 60 minutes is shown in FIG. 5. The arrows in FIG. 5 show the time interval where the lubricant was pulsed onto the conveyor. After each pulse, there was a successive drop in the COF measured. After the 4th pulse the COF was below 0.1 which is a target COF.

This example demonstrates that the bottles on the conveyor and the supports under the conveyor can be relied upon to spread the lubricant over the conveyor surface.

EXAMPLE 2

Deceleration Conveyor Test

This example uses a pulsed valve lubricant dispensing system on a deceleration conveyor at a commercial bottling plant. Deceleration conveyors are common areas in commercial bottling plants where bottle tipping often occurs.

Figure 6:
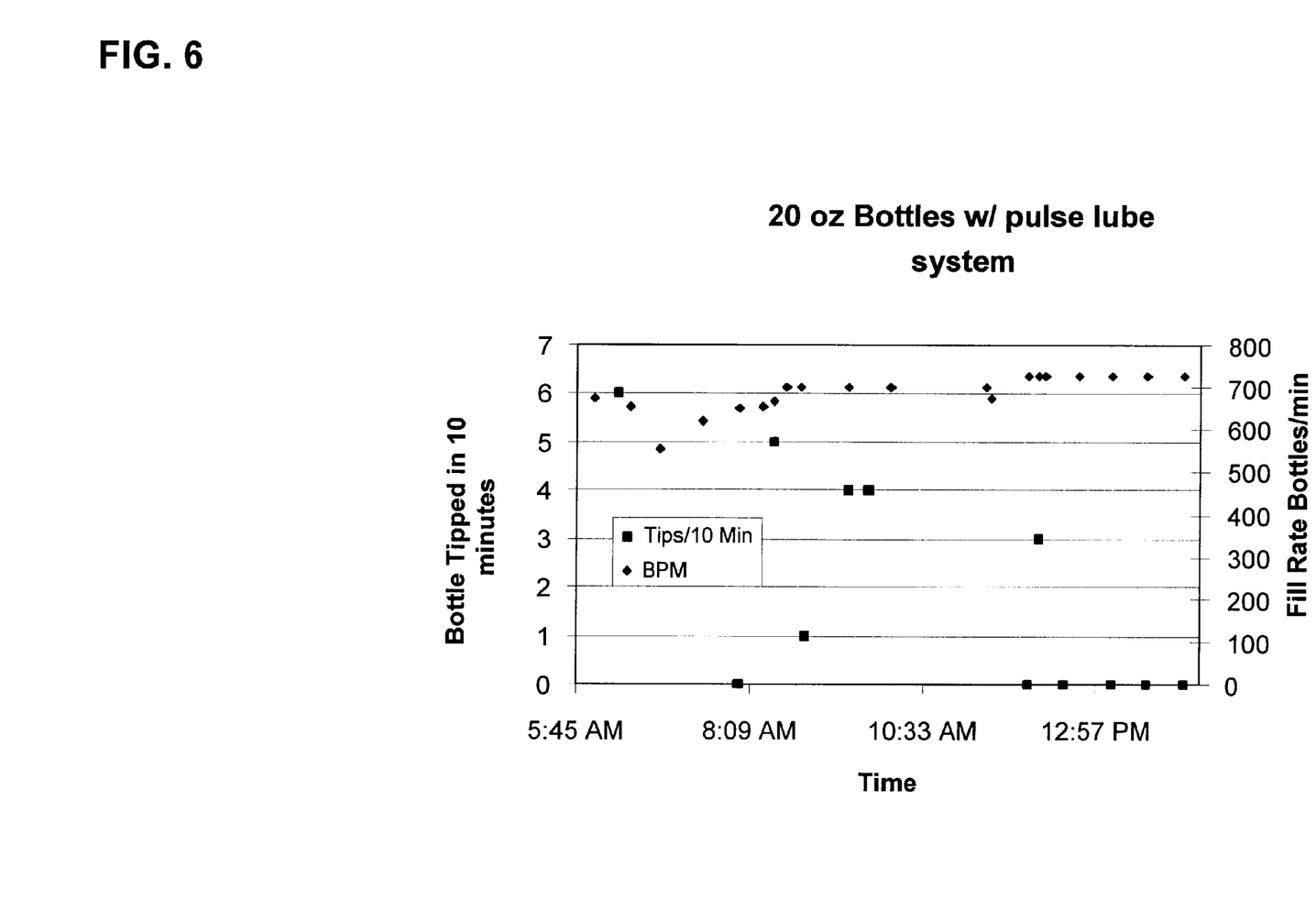
FIG. 6 is a graphical representation of bottles tipped as a function of time for the results of Example 2.
Figure 7:
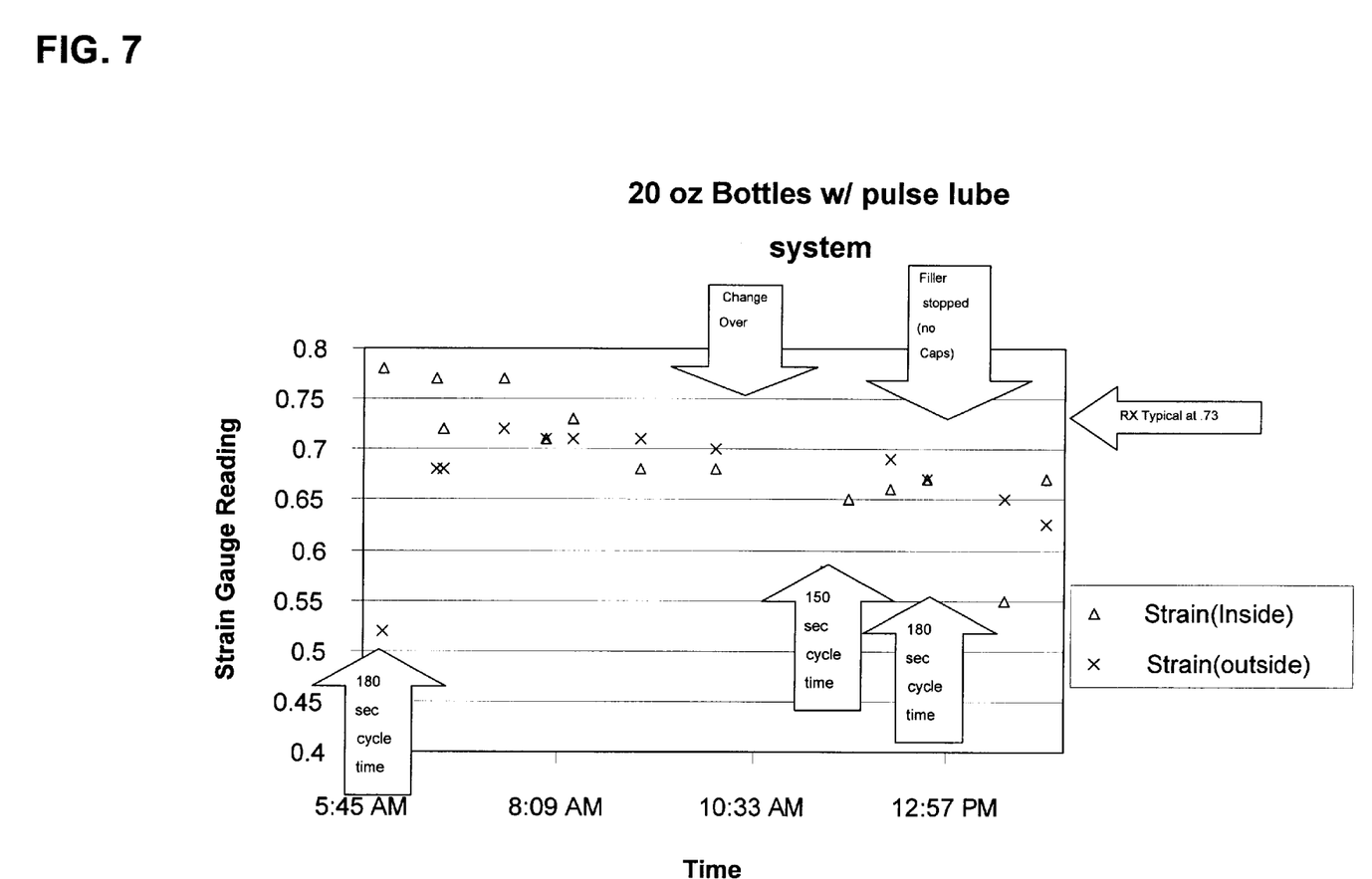
FIG. 7 is a graphical representation of strain gauge reading as a function of time for the results of Example 2.

Strain gauge measurements and bottle tipping rates were recorded throughout the day. The results are reported in FIGS. 6 and 7. The results show that the bottle tipping rates (>3 tips/10 minutes) and strain gauge reading (>0.73) were too high in the in the early hours of the example. By 10:00 AM, the bottle tipping rates and strain gauge readings were both in desired ranges. By dosing the conveyor with more pulses early in the morning, it is believed that it will be possible to speed up the transition from a dry to a well-lubricated conveyor.

EXAMPLE 3

This example extends the test of Example 2 to a second spray zone in a commercial bottling facility. The test was run for 3 days and different types of bottles were processed. N1 refers to the first spray zone and N2 refers to the second spray zone. Four nozzles were located in the first spray zone and are labeled as N1.1, N1.2, N1.3, and N1.4. Four spray nozzles were located in the second spray zone and are labeled as N2.1, N2.2, N2.3, and N2.4.

The amount of lubricant sprayed out each nozzle was measured each morning and was relatively constant. The measurements are reported in Table 1.

TABLE 1

| | milliliters collected form each nozzle. | | | | | | | |
|---|---|---|---|---|---|---|---|---|
| Date_Time | N1.1 | N1.2 | N1.3 | N1.4 | N2.1 | N2.2 | N2.3 | N2.4 |
| day 1 7:00 AM | 1.1 | 1.0 | 0.9 | 1.0 | 2.0 | 1.0 | 1.0 | 1.7 |
| day 2 6:50 AM | 1.1 | 1.0 | 0.9 | 0.9 | 2.0 | 1.0 | 0.9 | 1.8 |
| day 3 9:47 AM | 1.1 | 1.1 | 0.9 | 1.0 | 2.0 | 0.9 | 0.8 | 1.5 |

The systems controller was programmed to collect information on how many times each zone had sprayed. We also marked the side of a 15 gallon drum containing a supply of lubricant to manually check the usage rates. At the end of the test we found the usage rate measured on the side of the drum to be within 8.9% of that calculated by using pulse counts from the controller. This calculation indicated that the quantities measured from the nozzles were in line with the quantities pumped out of the drum.

Figure 8:
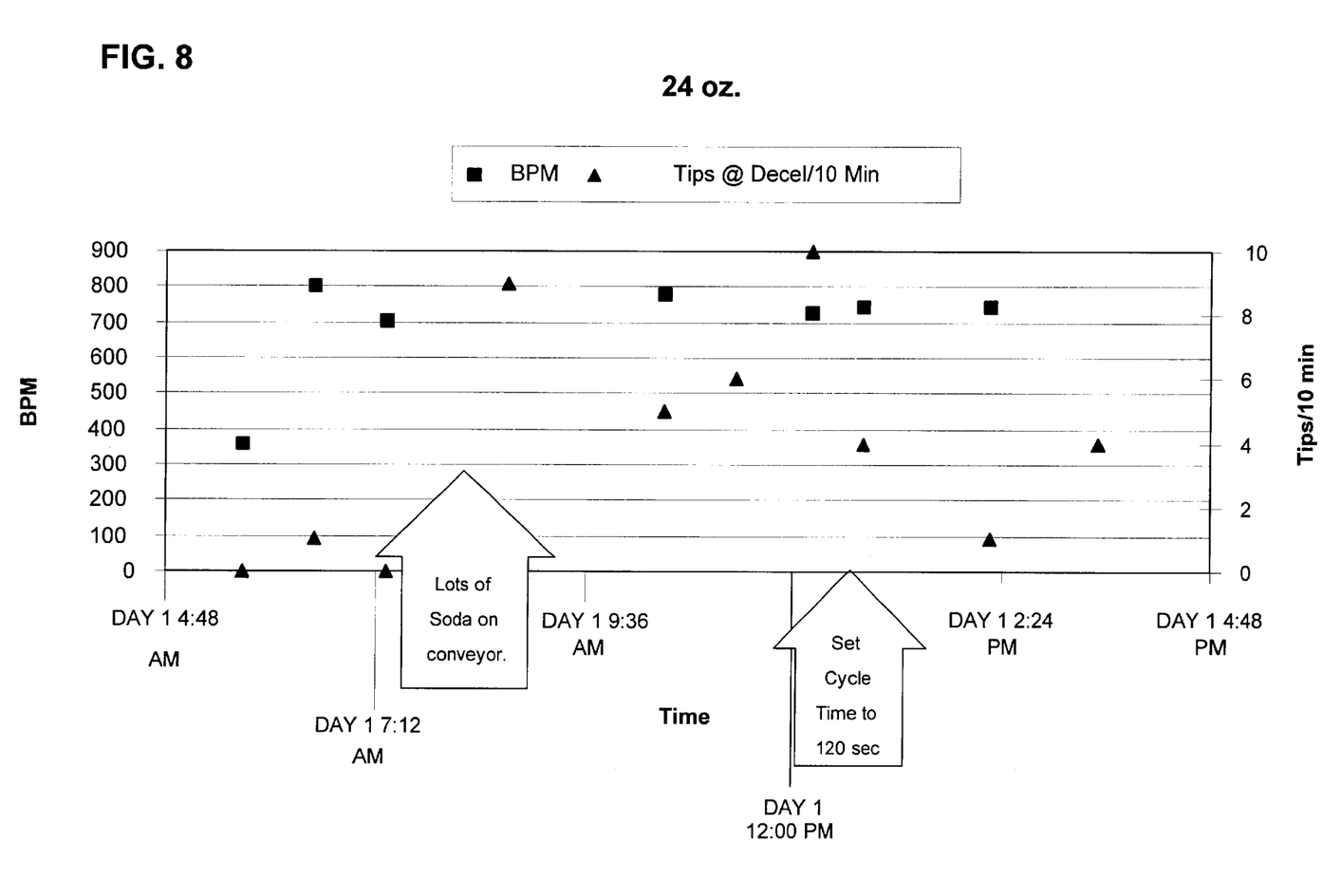
FIG. 8 is a graphical representation of rate of bottles and bottles tipped as a function of time.
Figure 9:
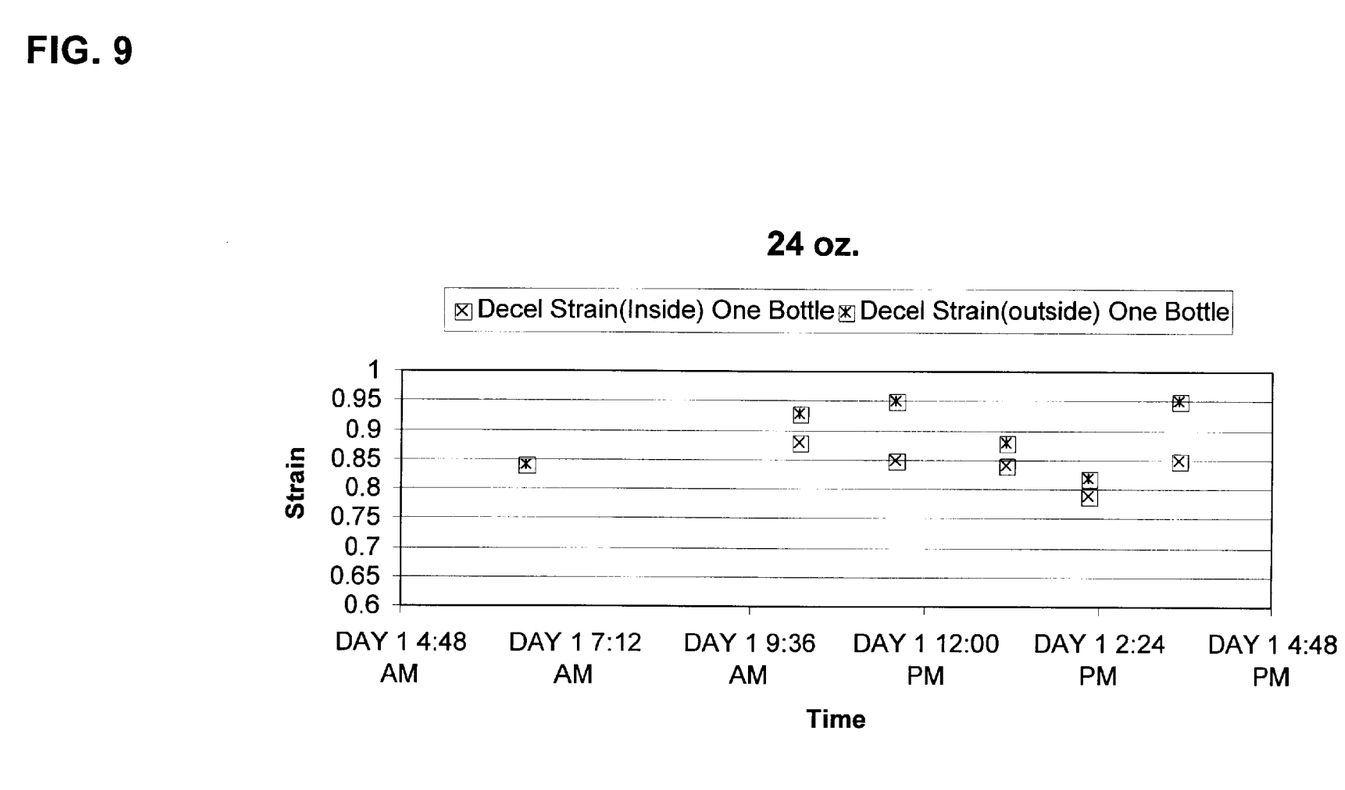
FIG. 9 is a graphical representation of strain as a function of time for the results of Example 3.

Two liter soda bottles ran on the system with no issues. FIGS. 8 and 9 show the results of observations on the 24 oz. bottles. During the 24 oz bottling, we observed soda on the deceleration conveyors that we believed caused a high tipping rate. At about 12:30 PM we turned down the lube cycle time to 120 seconds which increased the lube dispensing rate. We observed a decrease in both bottle tips and strain gauge measurements after this time.

Dosing the conveyors with many pulses (20 at zone 1) at startup in the morning proved to be a good strategy. Low strain gauge measurements confirmed an adequate amount on lube had been applied to the conveyors.

EXAMPLE 4

The purpose of this example is to compare a method for dispensing lubricant in pulses to a method for dispensing lubricant continuously. Deceleration conveyors at a bottling plant were used for this example. Deceleration conveyors were tested because they are the areas in a bottling plant where bottle tipping is generally most likely to occur.

Table 2 compares the dispensing rate for a continuous dispensing system with rates expected with the pulsing dispensing system according to the invention. With the continuous dispensing system at the deceleration area, six nozzles were installed to cover the deceleration area. Using the pulsing dispensing system, three nozzles were installed to cover the same area. The continuous dispensing system and the pulsing dispensing system were operated to dispense about the same amount of lubricant. The continuous dispensing system sprayed lubricant at a rate of 0.75 to 2 grams per minute. To target the same lubricant usage rate, the cycle time for the pulsing dispensing system was set to 150 seconds. Strain gauge readings were taken every 20 minutes on the conveyor with four bottles on the end of a rope. The bottle tips within a 10 minute period were counted and the bottling rate was observed. The deceleration conveyor tested is part of a bottling facility capable of operating at over 800 bottles/minute.

TABLE 2

| Nozzle System | Nozzle Spray Rate (gram/min) | Pulse Width On (sec) | Cycle Time (sec) | Lube per Cycle (grams) | Spray Width (inches) | Lube Rate (gram/hr) |
|---|---|---|---|---|---|---|
| Constant | 2 | 60 | 240 | 2 | 4.5 | 30.00 |
| Constant | 1 | 60 | 360 | 1 | 9 | 10.00 |
| Constant | 1 | 60 | 360 | 1 | 9 | 10.00 |
| Constant | 1 | 60 | 360 | 1 | 9 | 10.00 |
| Constant | 0.75 | 60 | 360 | 0.75 | 9 | 7.50 |
| Constant | 0.75 | 60 | 360 | 0.75 | 9 | 7.50 |
| Pulsed Flow | 64.345 | 1 | 150 | 1.07 | 18.3 | 25.74 |
| Pulsed Flow | 64.345 | 1 | 150 | 1.07 | 18.3 | 25.74 |
| Pulsed Flow | 64.345 | 1 | 150 | 1.07 | 18.3 | 25.74 |

Usage with constant on nozzle system: 75.00 gram/hr
Usage with pulsed flow nozzle system: 77.21 gram/hr The above specification, examples and data provide a complete description of the manufacture and use of the composition of the invention. Since many embodiments of the invention can be made without departing from the spirit and scope of the invention, the invention resides in the claims hereinafter appended.

We claim:

1. A conveyor and lubricating apparatus comprising:
 (a) a conveyor having a conveyor surface and being provided for transporting items on the conveyor surface; and
 (b) a dispensing device for providing a spray pattern of a lubricant composition onto the conveyor surface, the dispensing device comprising:
   (i) a nozzle that generates the spray pattern when the lubricant composition is supplied to the nozzle at a pressure of greater than about 20 psig;
   (ii) a lubricant dispensing line that supplies the lubricant composition to the nozzle;

(iii) a nozzle valve that opens and closes in response to the pressure conditions within the lubricant dispensing line to control flow of the lubricant composition to the nozzle; and (iv) a spray valve constructed to move between a first position and a second position, the first position causing pressurization of the lubricant dispensing line, and the second position providing depressurization of the lubricant dispensing line.

2. A conveyor and lubricating apparatus according to claim 1, wherein the conveyor comprises a support structure that contacts the conveyor surface during operation of the conveyor to spread the lubricant composition over the conveyor surface.

3. A conveyor and lubricating apparatus according to claim 2, wherein the support structure comprises at least one of a roller, a conveyor return support, and a wear plate.

4. A conveyor and lubricating apparatus according to claim 1, wherein the dispensing device comprises at least two nozzles that each generate a spray pattern when the lubricant composition is supplied to each nozzle at a pressure of at least about 25 psig.

5. A conveyor and lubricating apparatus according to claim 1, wherein the dispensing device comprises at least two spray valves arranged in parallel, and each spray valve dispenses the lubricant composition to at least one nozzle, and each nozzle includes a nozzle valve for controlling flow of the lubricant composition through the nozzle in response to pressure conditions up stream of the nozzle valve.

6. A conveyor and lubricating apparatus according to claim 1, wherein the dispensing device further comprises a lubricant product tank for supplying the lubricant composition under pressure to a high pressure lubricant line upstream of the spray valve.

7. A conveyor and lubricating apparatus according to claim 1, wherein the spray valve is pneumatically operated to move between the first position and the second position.

8. A conveyor and lubricating apparatus according to claim 1, wherein the conveyor comprises at least one of a transport conveyor, a deceleration conveyor, and an acceleration conveyor.

9. A conveyor and lubricating apparatus according to claim 1, wherein the dispensing device further comprises a pressure chamber for distributing pressure along a length of a high pressure line upstream of the nozzle valve.

10. A conveyor and lubricating apparatus according to claim 1, wherein the dispensing device further comprises a lubricant venting line attached to the spray valve so that the lubricant dispensing line is in communication with the lubricant venting line when the spray valve is in the second position.

11. A conveyor and lubricating apparatus according to claim 10, further comprising a recycle tank in communication with the lubricant venting line, wherein the recycle tank is constructed to receive lubricant composition from the lubricant venting line.

12. A conveyor and lubricating apparatus according to claim 11, wherein the recycle tank is vented to atmospheric pressure.

13. A conveyor and lubricating apparatus according to claim 10, further comprising a pressure relief chamber in communication with the lubricant venting line.

14. A dispensing device for dispensing a spray pattern of a lubricant composition comprising:

(a) a nozzle that generates the spray pattern when the lubricant is supplied to the nozzle at a pressure of greater than about 20 psig;

(b) a lubricant dispensing line that supplies the lubricant composition to the nozzle;

(c) a nozzle valve that opens and closes in response to the pressure conditions within the lubricant dispensing line to control flow of the lubricant composition to the nozzle; and (d) a spray valve constructed to move between a first position and a second position, the first position causing pressurization of the lubricant dispensing line, and the second position providing depressurization of the lubricant dispensing line.

15. A dispensing device according to claim 14, wherein the dispensing device comprises at least two nozzles that each generate the spray pattern when the lubricant composition is supplied to the nozzle at a pressure of at least about 25 psig.

16. A dispensing device according to claim 14, wherein the dispensing device comprises at least two spray valves arranged in parallel, and each spray valve dispenses the lubricant composition to at least one nozzle, and each nozzle includes a nozzle valve for controlling flow of the lubricant composition through the nozzle in response to pressure conditions.

17. A dispensing device according to claim 14, wherein the dispensing device further comprises a lubricant product tank for supplying the lubricant composition under pressure to a high pressure lubricant line upstream of the spray valve.

18. A dispensing device according to claim 14, wherein the spray valve is pneumatically operated to move between the first position and the second position.

19. A dispensing device according to claim 14, wherein the conveyor comprises at least one of a transport conveyor, a deceleration conveyor, and an acceleration conveyor.

20. A dispensing device according to claim 14, wherein the dispensing device further comprises a pressure chamber for distributing pressure along a length of a high pressure line upstream of the nozzle valve.

21. A dispensing device according to claim 14, wherein the dispensing device further comprises a lubricant venting line attached to the spray valve so that the lubricant dispensing line is in communication with the lubricant venting line when the spray valve is in the second position.

22. A dispensing device according to claim 21, further comprising a recycle tank in communication with the lubricant venting line, wherein the recycle tank is constructed to receive lubricant composition from the lubricant venting line.

23. A conveyor and lubricating apparatus according to claim 22, wherein the recycle tank is vented to atmospheric pressure.

24. A conveyor and lubricating apparatus according to claim 22, further comprising a pressure relief chamber in communication with the lubricant venting line.

25. A method for applying a lubricant composition to a conveyor surface, the method comprising steps of:

(a) periodically spraying the lubricant composition through a dispensing device onto the conveyor surface to reduce the coefficient of friction between the conveyor surface and items conveyed on the conveyor surface, where the dispensing device comprises:

(i) a nozzle that generates a spray pattern when the lubricant composition is supplied to the nozzle at a pressure of greater than about 20 psig;

(ii) a lubricant dispensing line that supplies the lubricant composition to the nozzle;

(iii) a nozzle valve that opens and closes in response to the pressure conditions within the lubricant dispensing line to control flow of the lubricant composition to the nozzle; and (iv) a spray valve constructed to move between a first position and a second position, the first position causing pressurization of the lubricant dispensing line, and the second position providing depressurization of the lubricant dispensing line.

26. A method according to claim 25, wherein the spray pattern has a width of between about 4 inches and about 30 inches.

27. A method according to claim 25, wherein the step of periodically spraying comprises spraying the lubricant composition through the spray nozzle for between about 1 second and about 20 seconds at a frequency of between about 1 minute and about 10 minutes.

28. A method according to claim 25, wherein about 0.5 grams to about 10 grams of the lubricant composition is dispensed through the spray nozzle for each period of spraying.

29. A method according to claim 25, wherein the lubricant composition has a water content of less than about 85 wt. %.

30. A method according to claim 25, wherein at least two nozzles are provided for dispensing the lubricant composition across a width of the conveyor surface.

31. A method according to claim 25, further comprising a step of:

(a) conveying articles on the conveyor surface of the conveyor.

32. A method according to claim 31, wherein the articles comprise at least one of plastic bottles, glass bottles, and aluminum cans.

33. A method according to claim 25, wherein the lubricant composition comprises at least one of a fatty acid based lubricant composition, a fatty amine based lubricant composition, and a synthetic surfactant based lubricant composition.

* * * * *